(12) United States Patent
Lan et al.

(10) Patent No.: US 7,733,194 B2
(45) Date of Patent: Jun. 8, 2010

(54) NONLINEAR TRANSMISSION LINE MODULATOR

(75) Inventors: Xing Lan, Huntington Beach, CA (US); Mark Kintis, Manhattan Beach, CA (US); Flavia S. Fong, Monterey Park, CA (US)

(73) Assignee: Northrop Grumman Space and Mission Systems Corporation, Los Angeles, CA (US)

( * ) Notice: Subject to any disclaimer, the term of this patent is extended or adjusted under 35 U.S.C. 154(b) by 392 days.

(21) Appl. No.: 11/934,310

(22) Filed: Nov. 2, 2007

(65) Prior Publication Data

US 2009/0115545 A1 May 7, 2009

(51) Int. Cl.
*H04B 3/04* (2006.01)
(52) U.S. Cl. ............ 333/20; 333/156; 307/106
(58) Field of Classification Search ........... 332/109; 333/20, 156; 307/106; 327/184, 291, 293, 327/294
See application file for complete search history.

(56) References Cited

U.S. PATENT DOCUMENTS

| | | | |
|---|---|---|---|
| 3,205,375 A | 9/1965 | Berry | |
| 3,418,604 A | 12/1968 | Ross | |
| 3,462,699 A | 8/1969 | Sear | |
| 5,014,018 A | 5/1991 | Rodwell et al. | |
| 5,023,574 A | 6/1991 | Anklam et al. | |
| 5,157,361 A | 10/1992 | Gruchalla et al. | |
| 5,208,560 A | 5/1993 | Yasutake | |
| 5,256,996 A | 10/1993 | Marsland et al. | |
| 5,274,271 A | 12/1993 | McEwan | |
| 5,352,627 A | 10/1994 | Cooper | |
| 5,352,994 A | 10/1994 | Black et al. | |
| 5,396,198 A | 3/1995 | Yamashita et al. | |
| 5,789,994 A | 8/1998 | Case et al. | |

(Continued)

FOREIGN PATENT DOCUMENTS

EP  0 419 078  3/1991

OTHER PUBLICATIONS

Jun Wang et al: "*A Modulation Circuit for Impulse Radio Ultra-Wideband Communications*"; School of Information Science and Technology, University of Science and Technology of China, P.R. China, Anhui, Hefei, 230027; APMC2005 Proceedings, 2005.

(Continued)

*Primary Examiner*—Joseph Chang
*Assistant Examiner*—Jeffrey Shin
(74) *Attorney, Agent, or Firm*—Tarolli, Sundheim, Covell & Tummino LLP (57) ABSTRACT

A modulator is provided that comprises a nonlinear transmission line (NLTL) that is bias modulated by a baseband signal. A given logic state of the baseband signal determines a delay amount of a first carrier signal through the NLTL. The modulator further comprises an impulse forming network (IFN) that includes a first NLTL that receives the first carrier signal delayed by the determined delay amount and a second NLTL that receives a second carrier signal having a fixed delay amount. The first NLTL and second NLTL within the IFN have opposite diode polarity configurations. The modulator further comprises a power combiner that converts a delta delay of the first carrier signal relative to the second carrier signal to a sharp impulse that represents the given logic state of the baseband signal.

20 Claims, 7 Drawing Sheets

U.S. PATENT DOCUMENTS

| | | | |
|---|---|---|---|
| 5,804,821 | A | 9/1998 | McEwan et al. |
| 6,239,637 | B1 | 5/2001 | Williamson |
| 6,320,480 | B1 | 11/2001 | Kintis et al. |
| 6,396,338 | B1 * | 5/2002 | Huang et al. ............ 329/336 |
| 6,538,525 | B1 | 3/2003 | Williamson |
| 6,690,247 | B2 | 2/2004 | Kintis et al. |
| 7,193,486 | B2 | 3/2007 | Mrozek et al. |
| 2003/0146800 | A1 | 8/2003 | Dvorak |
| 2007/0008048 | A1 | 1/2007 | Kintis |

OTHER PUBLICATIONS

Yoichi Kawano et al: "*Sub-10 ps Pulse Generator with Biphase Modulation Function in 0.13-μm InP HEMT*"; Fujitsu Laboratories Ltd., Atsugi, Kanagawa, Japan, Sep. 2006.

Rodwell M J W: "*GAAS Nonlinear Transmission Lines for Picosecond Pulse Generation and Millimeter-Wave Sampling*"; IEEE Transactions on Microwave Theory and Techniques, IEEE Service Center, Piscataway, NG, US, vol. 39, No. 7, Jul. 1, 1991, pp. 1194-1204, XP000206295.

International Search Report for PCT/US2006/025553, completed Aug. 17, 2007 by John Jepsen of the EPO.

Falah, M et al: "*High Data Rate Pulse Regeneration Using Non-Linear Transmission Line Technology*"; 2001 IEEE 6th High Frequency Postgraduate Student Colloquium, Sep. 9-10, 2001, pp. 136-141.

\* cited by examiner

For input baseband binary data "1" (+Δτ)

FIG. 9

For input baseband binary data "0" (-Δτ)

NONLINEAR TRANSMISSION LINE MODULATOR

TECHNICAL FIELD

The present invention relates generally to communications, and more particularly to a Nonlinear Transmission Line (NLTL) modulator.

BACKGROUND OF THE INVENTION

Ultra Wideband Impulse Radio (UWB-IR) is an emerging next generation worldwide technology for short range radar and wireless communications. UWB-IR utilizes extremely short pulses (picosecond/sub-picosecond) to transmit information rather than transmitting information employing the traditional sinusoidal carrier. Filters are then employed to match the spectrum mask. UWB-IR possesses fine multi-path resolution with great potential to solve difficult mobile or indoor communications problems, such as fading, interference, etc. UWB-IR is a spread spectrum signaling technology that occupies a large bandwidth with low transmitting power spectral density, and can co-exist with other systems. A UWB-IR modulator can be built utilizing a simple system configuration eliminating the need for an up/down converter and frequency recovery loops.

UWB-IR modulators have been built employing different types of technologies. For example, J Wang et al. discloses a UWB-IR modulator that generates a picosecond pulses by employing a high speed RF switch in an article entitled "A Modulation Circuit for Impulse Radio Ultra-Wideband Communications" in the Proceedings of the 2005 Asia-Pacific Microwave Conference. However, the switch speed limits the bandwidth of the baseband signal and may introduce undesired waveform distortion. Additionally, the modulator employs a step recovery diode (SRD) for pulse generation. Step Recovery Diodes (SRDs) have potential instability and repeatability issues. Y Kawano et al. discloses a pulse generator for generating picosecond pulses that are biphase modulated by employing a digital IC techniques with a delay control buffer and an AND circuit in an article entitled "Sub-10 ps Pulse Generator with Biphase Modulation Function in 0.13 um InP HEMT" also in the Proceedings of the 36$^{th}$ European Microwave Conference. The digital IC technique can consume amounts of power (approximately 640 milliwatts) that are unacceptable for certain applications.

SUMMARY OF THE INVENTION

In one aspect of the invention, a modulator is provided. The modulator comprises a nonlinear transmission line (NLTL) that is bias modulated by a baseband signal. A given logic state of the baseband signal determines a delay amount of a first carrier signal through the NLTL. The modulator further comprises an impulse forming network (IFN) that includes a first NLTL that receives the first carrier signal delayed by the determined delay amount and a second NLTL that receives a second carrier signal having a fixed delay amount. The first NLTL and second NLTL have opposite diode polarity configurations. The modulator further comprises a power combiner that converts a delta delay of the first carrier signal relative to the second carrier signal to a sharp impulse that represents the given logic state of the baseband signal.

In another aspect of the invention, a modulator is provided that comprises a first NLTL that provides a delta delay path for a first carrier signal, such that the first NLTL is bias modulated by a baseband signal and a second NLTL that provides a reference delay path and is biased by a fixed DC point to provide a fixed delay amount to a second carrier signal, wherein a given logic state of the baseband signal determines a relative delay offset of first carrier signal with respect to the second carrier signal. The first NLTL and the second NLTL have a same diode and bias polarity configuration. The modulator further comprises a third NLTL that receives the first carrier signal from the first NLTL and a fourth NLTL that receives the second carrier signal from the second NLTL, wherein the third NLTL and fourth NLTL having opposite diode and bias polarity configurations. The modulator further comprises a power combiner that combines the first carrier signal relative and the second carrier signal and converts the relative delay offset to a sharp impulse that represents the given logic state of the baseband signal.

In yet another aspect of the invention, a method of modulating a baseband signal into an impulse waveform is provided. The method comprises providing a first carrier signal to a first NLTL, providing a second carrier signal to a second NLTL, biasing the second NLTL with a fixed DC voltage and biasing the first NLTL with a baseband signal, wherein a given logic state of the baseband signal determines a relative delay offset of first carrier signal with respect to the second carrier signal. The method further comprises providing the first carrier signal to a third NLTL from the first NLTL, providing the second carrier signal to a fourth NLTL from the second NLTL, such that the third and fourth NLTLs have opposite diode polarity configurations, and combining the first carrier signal from the third NLTL and the second carrier signal from the fourth NLTL to generate and impulse waveform representing the given logic state of the baseband signal.

DETAILED DESCRIPTION OF INVENTION

The present invention relates to a modulator for Ultra Wide Band Impulse Radio and Radar that employs Nonlinear Transmission Line (NLTL) technology to encode data onto picosecond pulse carriers by employing a baseband signal to modulate a bias of an NLTL. The modulator includes a divider that receives a sinusoidal input signal that is divided into a first and a second carrier signal, which are provided to a differential delay network (DDN). The DDN is formed of two same diode polarity NLTLs. A first NLTL is bias modulated by a baseband input signal that contains the desired data to be modulated. A second NLTL is biased by a fixed DC point which produces a delay in the middle of the available delay range. The difference between the bias due to the baseband input signal relative to the fixed DC point provides a desired relative time offset of the first and second carrier signals relative to one another at the outputs of the first and second NLTLs. The first and second carrier signals are then provided to an impulse forming network (IFN). The IFN is formed of two opposite diode polarity NLTLs that are AC coupled to the DDN. The IFN sharpens the rising edge of the first carrier signal and sharpens the falling edge of the second carrier signal and cooperates with a power combiner to convert the delta delay of the first and second carrier signals into modulated sharp impulses.

NLTL is a structure that consists of RF/microwave transmission line sections periodically loaded by Schottky varactor diodes. The RF/microwave transmission line can be modeled as a lumped inductance, so the NLTL can be modeled as a plurality of sections of LC networks. The varactor's capacitance can be varied by using different DC bias voltage to change the electrical properties of the NLTL. The transmission line can be microstrip, coplanar waveguide type or a variety of other types of transmission lines. The diodes can be connected to the transmission line in a positive diode polarity configuration with the cathode of the diodes coupled to the transmission line and the anodes of the diodes coupled to ground, or in a negative diode polarity configuration with the anode of the diodes coupled to the transmission line and the cathodes of the diodes coupled to ground. In pulse shaping application, the positive diode polarity configuration will receive a positive voltage bias and will sharpen the rising edge of a waveform input into the NLTL and the negative diode polarity configuration will receive a negative voltage bias and sharpen the falling edge of a waveform input into the NLTL.

Figure 1:
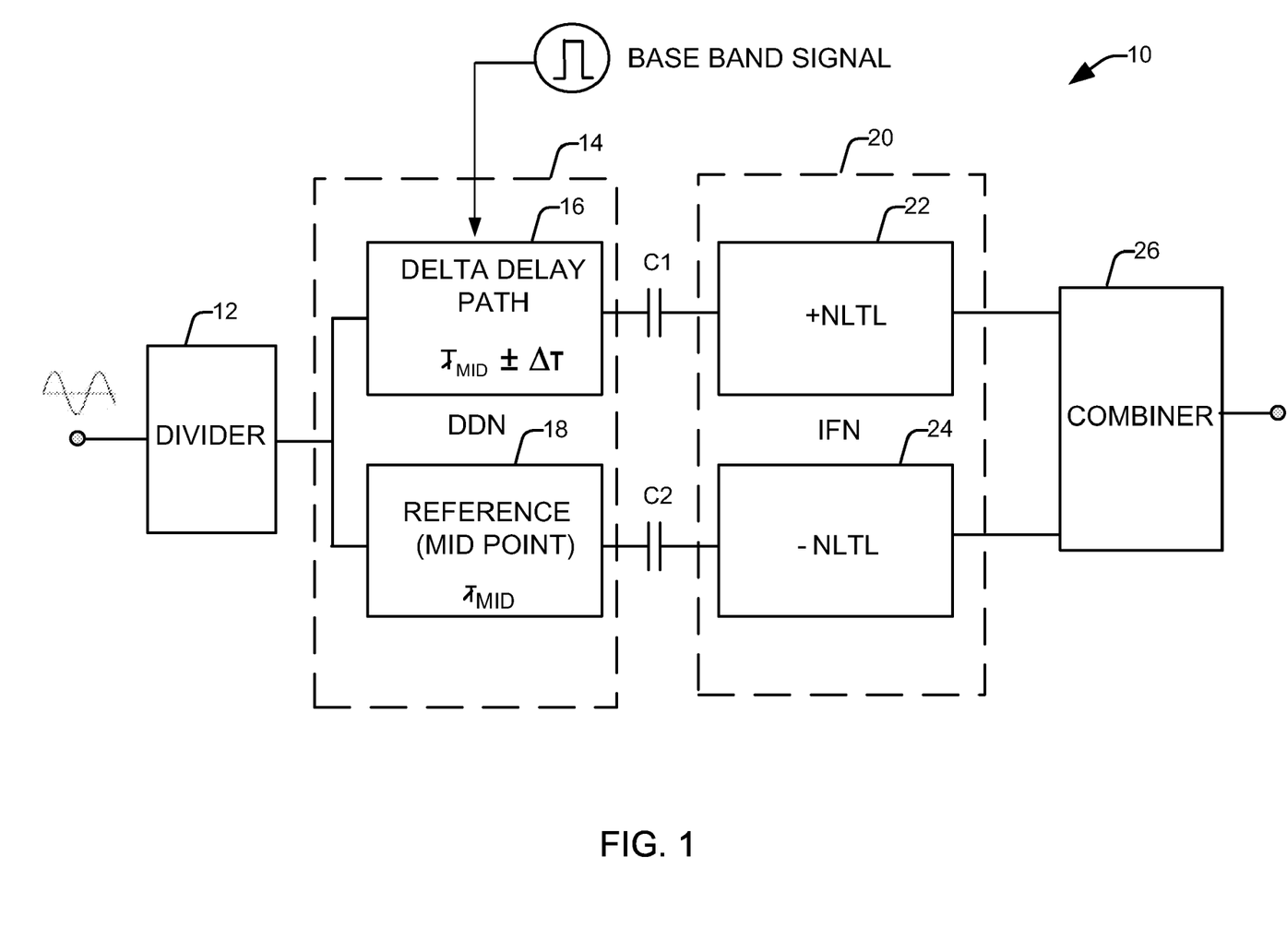
FIG. 1 illustrates a schematic view of a Nonlinear Transmission Line (NLTL) modulator in accordance with an aspect of the present invention.

FIG. 1 illustrates a schematic view of a NLTL modulator 10 in accordance with the present invention. The NLTL modulator 10 can be employed as an Ultra Wide Band Impulse Radio and Radar modulator. The NLTL modulator 10 includes a divider 12 that receives a sinusoidal input signal that is divided into a first and a second carrier signal, which are provided to a DDN 14. The second carrier signal is a substantial duplicate of the first carrier signal. The DDN 14 is formed of a first NLTL 16 that provides a delta delay path and a second NLTL 18 that provides a reference delay path. The first NLTL 16 and the second NLTL 18 are of the same bias polarity and same diode polarity, which is either in a rising edge compression mode with positive biases and cathodes of the diodes coupled to the transmission line of the NLTL (positive diode polarity configuration), or in falling edge compression with negative biases and anodes connected to the transmission line of the NLTL (negative diode polarity configuration). The first NLTL 16 is bias modulated by a baseband input signal that contains the desired data to be modulated. The second NLTL 18 is biased by a fixed DC point which produces a delay in the middle of the available delay range. The difference between the bias due to the baseband input signal relative to the fixed DC point provides a desired relative time offset of the first and second carrier signals relative to one another at the outputs of the first NLTL 16 and second NLTL 18, respectively.

The first and second carrier signals are then provided to an impulse forming network (IFN) 20. It is to be appreciated that the second carrier signal can be provided as a reference signal through other mechanisms as long as the second carrier signal has a fixed delay, such that a desired relative time offset between the first and second carrier signals can be provided to the IFN 20. The IFN 20 is formed of a positively biased third NLTL 22 and a negatively biased second NLTL 24 with opposite diode polarity configurations. The IFN 20 is AC coupled to the DDN 14 via blocking capacitors C1 and C2, which block the DC biasing of the NLTLs of the IFN 20 and DC biasing of the NLTLs of the DDN 14. The third NLTL 22 sharpens the rising edge of the first carrier signal and the fourth NLTL 24 inverts the second carrier signal and sharpens the falling edge of the inverted second carrier signal. The oppositely edge sharpened first and second carrier signals are delayed relative to one another based on the state of the baseband signal that biases the first NLTL 16 relative to the fixed bias of the second NLTL 18. The IFN 20 provides the oppositely edge sharpened first and second carrier signals to a power combiner 26 that converts the delta delay of the first and second carrier signals into modulated sharp impulses with encoded data based on a state of the baseband signal. For example, the modulated sharp impulse can be a positive impulse representing a logic "0" or a negative impulse representing a logic "1". Therefore, this forms the bi-phase modulation. Alternatively or in combination, the modulated sharp impulse can have a pulse width that represents a given logic state that can be a binary representation of the baseband signal. This forms the pulse width modulation. It is to be appreciated that the NLTL modulator 10 can be configured to transmit a variety of other different modulated formats.

Figure 2:
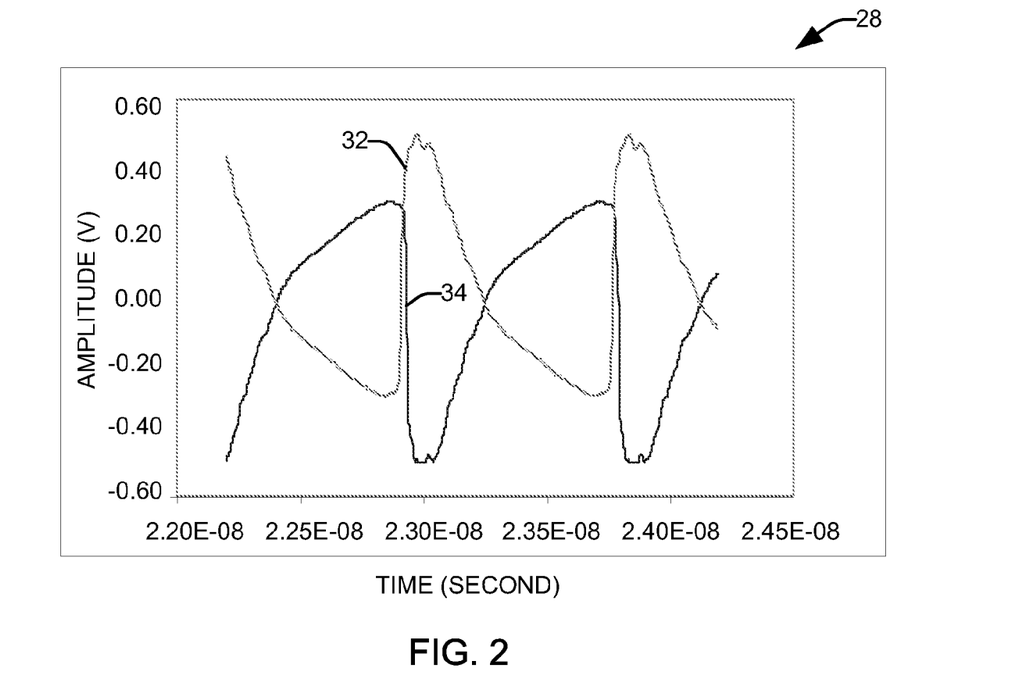
FIG. 2 illustrates a graph of amplitude versus time of oppositely edge sharpened first and second carrier signals in accordance with an aspect of the invention.
Figure 3:
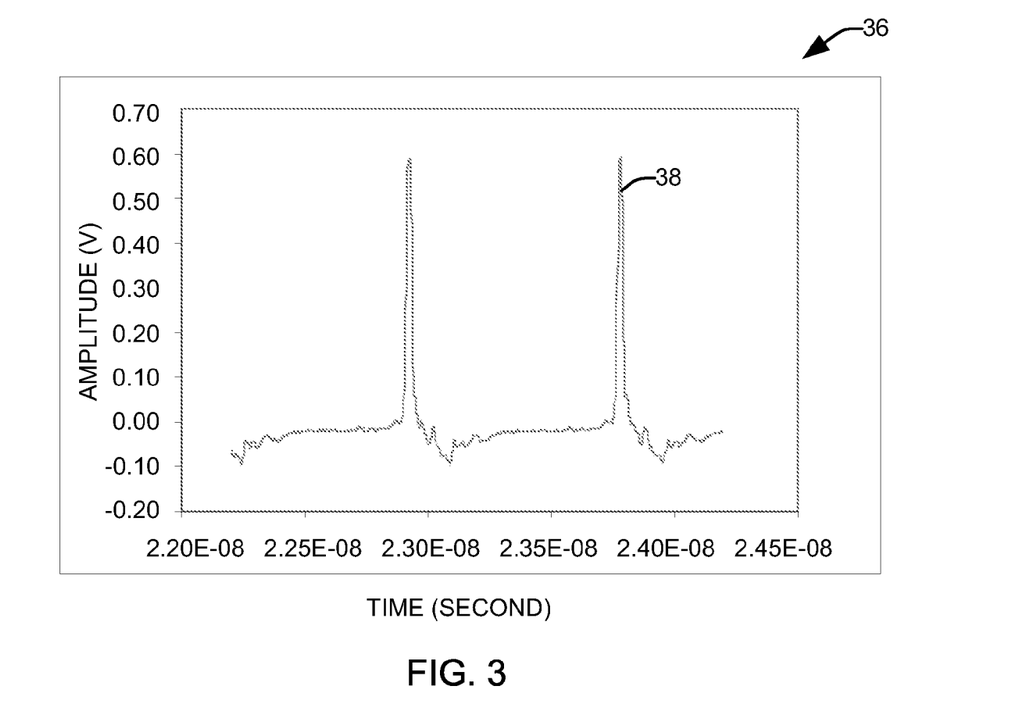
FIG. 3 illustrates a graph of amplitude versus time of a sharp resultant impulse waveform in accordance with an aspect of the present invention.

FIG. 2 illustrates a graph 30 of amplitude versus time of oppositely edge sharpened first and second carrier signals in accordance with an aspect of the invention. A first carrier signal 32, for example, is provided at the output of the third NLTL 22 and has a sharpened rising edge due to the positive diode polarity and bias configuration of the third NLTL 22, while the second carrier signal 34 is provided at the output of the fourth NLTL 24 and is an inversion of the first carrier signal 32 in addition to having a sharpened falling edge due to the negative diode polarity and bias configuration of the fourth NLTL 24. The second carrier signal 34 is also delayed relative to the first carrier signal 32. FIG. 3 illustrates a graph 36 of amplitude versus time of a sharp resultant impulse waveform 38 in accordance with an aspect of the present invention. The sharp resultant impulse waveform 38 is provided at the output of the power combiner 26 and is a result of the combination of the first carrier signal 32 with the second carrier signal 34, which is an inversion of the first carrier signal 32, and the delay of second carrier signal 34 relative to the first carrier signal 32. The techniques of combining waveforms to provide a sharp resultant impulse waveform are illustrated in commonly owned U.S. patent application Ser. No. 176,029, entitled, "Simple Time Domain Pulse Generator" filed Jul. 6, 2005, the entire contents of which are incorporated herein.

Figure 4:
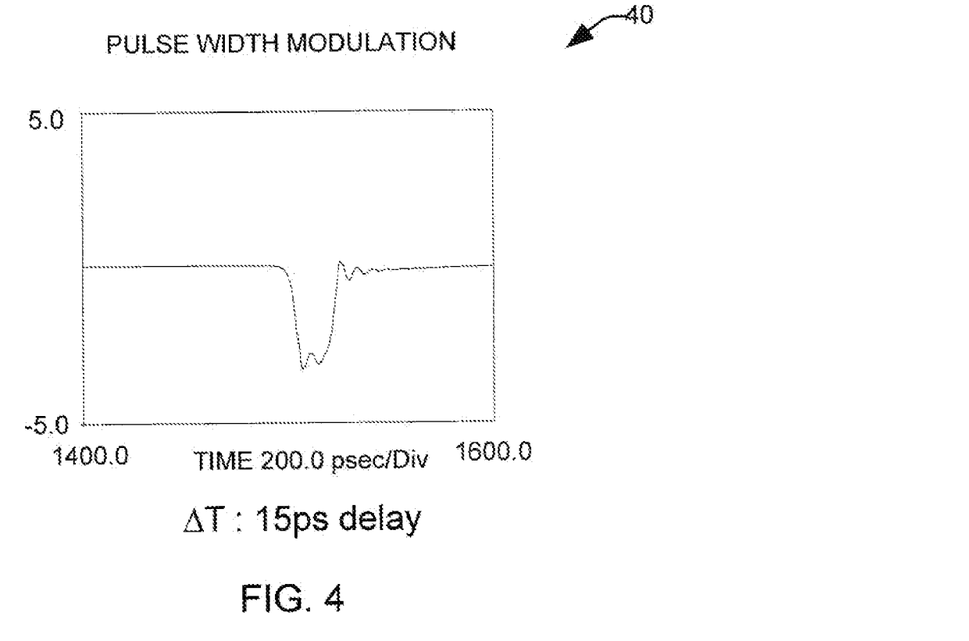
FIG. 4 illustrates a graph of amplitude versus time of a resultant impulse corresponding to a 15 picosecond (pS) delta delay in accordance with an aspect of the present invention.
Figure 5:
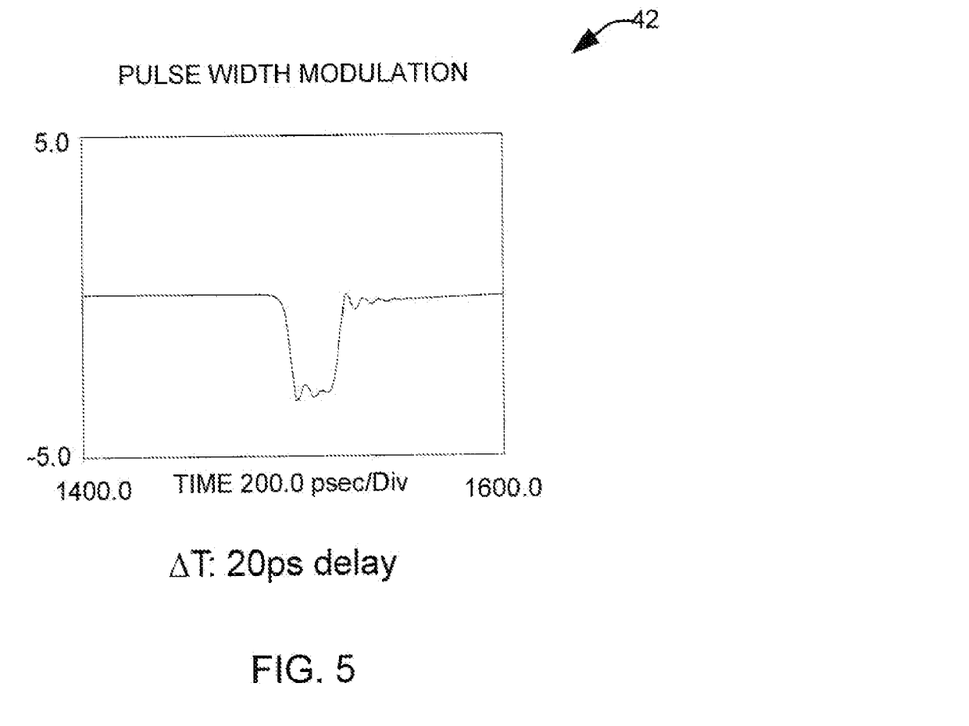
FIG. 5 illustrates a graph of amplitude versus time of a resultant impulse corresponding to a 20 picosecond (pS) delta delay in accordance with an aspect of the present invention.
Figure 6:
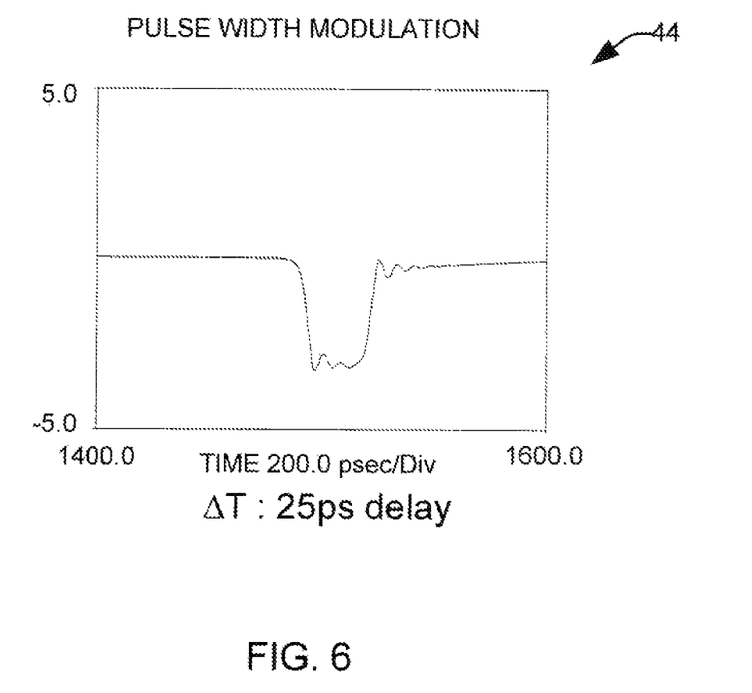
FIG. 6 illustrates a graph of amplitude versus time of a resultant impulse corresponding to a 25 picosecond (pS) delta delay in accordance with an aspect of the present invention.
Figure 7:
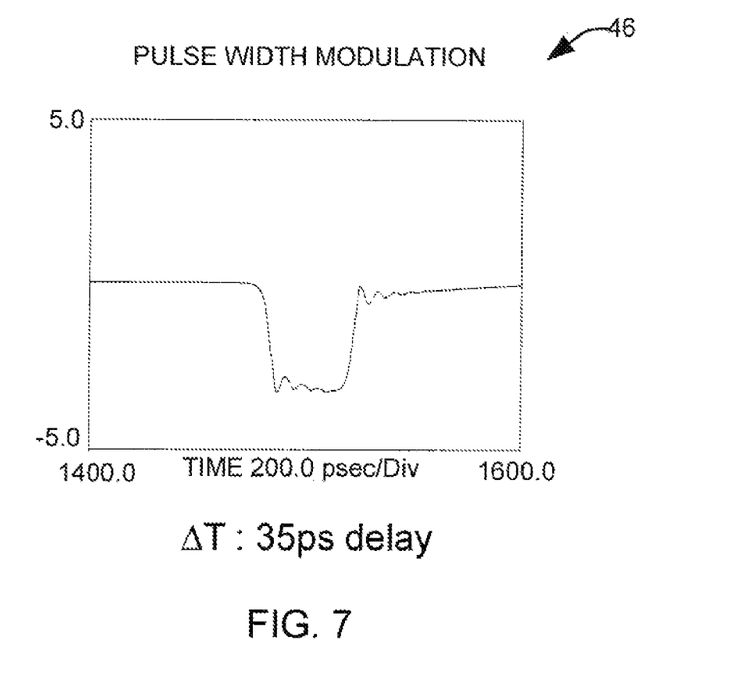
FIG. 7 illustrates a graph of amplitude versus time of a resultant impulse corresponding to a 35 picosecond (pS) delta delay in accordance with an aspect of the present invention.

FIGS. 4-7 illustrate resultant impulse waveforms that represent different logic states based on the pulse durations of the bias signal and associated delta delay in accordance with an aspect of the present invention. FIG. 4 illustrates a graph 40 of amplitude versus time of a resultant impulse with a pulse width corresponding to a 15 picosecond (pS) delta delay. The resultant impulse of FIG. 4 can represent a logic state of "00". FIG. 5 illustrates a graph 42 of amplitude versus time of a resultant impulse with a pulse width corresponding to a 20 picosecond (pS) delta delay. The resultant impulse of FIG. 5 can represent a logic state of "01". FIG. 6 illustrates a graph 46 of amplitude versus time of a resultant impulse with a pulse width corresponding to a 25 picosecond (pS) delta delay. The resultant impulse of FIG. 6 can represent a logic state of "10". FIG. 7 illustrates a graph 48 of amplitude versus time of a resultant impulse with a pulse width corresponding to a 35 picosecond (pS) delta delay. The resultant impulse of FIG. 7 can represent a logic state of "11". It is appreciated that the resultant impulse waveforms of FIGS. 4-7 are for illustrative purposes and a plurality of impulse widths, impulse sequences and impulse polarities can be employed alone or in combination to represent different logic states based on a desired application.

Figure 8:
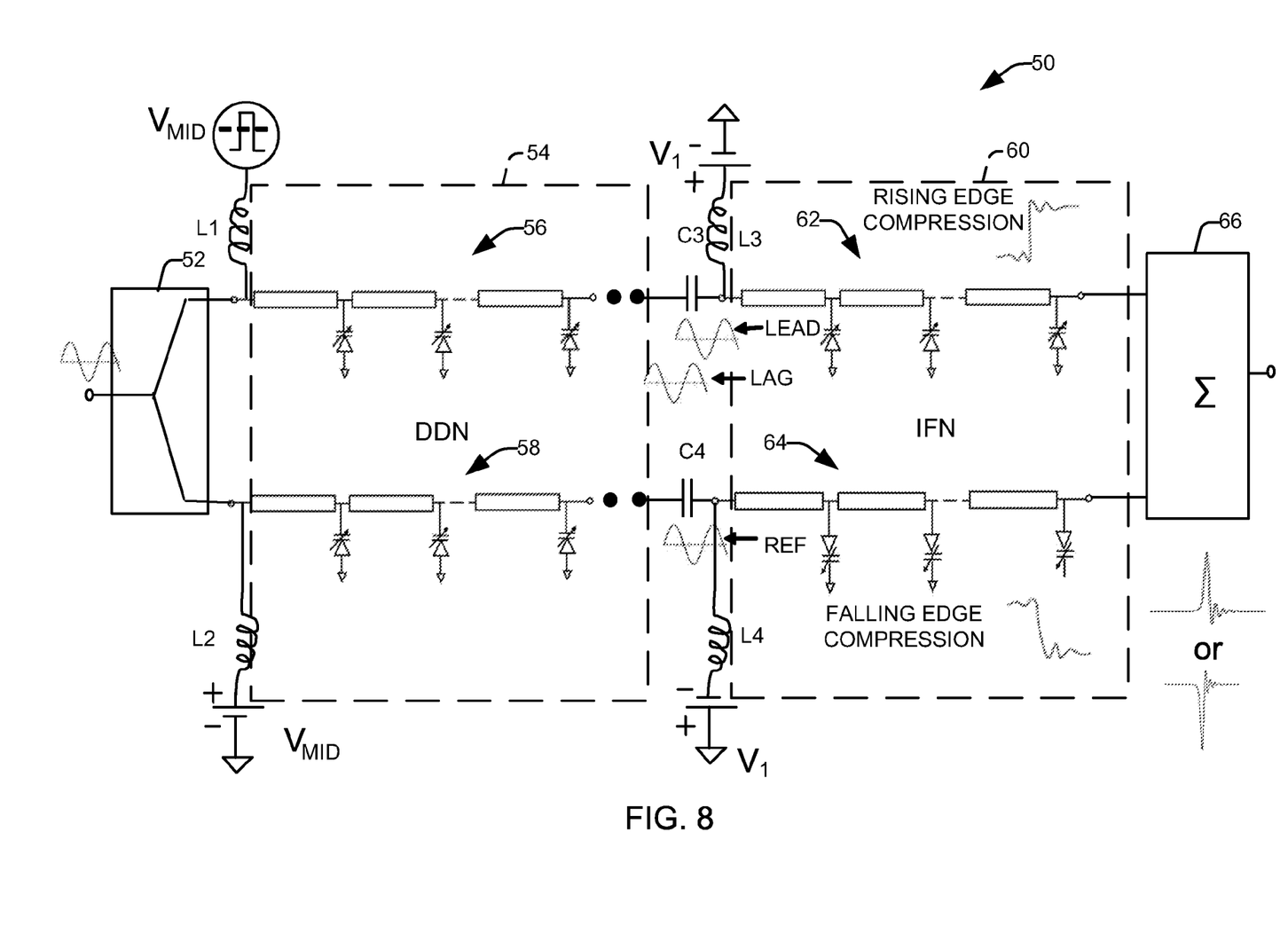
FIG. 8 illustrates a schematic view of a NLTL modulator configured to generate bi-phase modulation and pulse width modulation in accordance with an aspect of the present invention.

FIG. 8 illustrates a schematic view of a NLTL modulator 50 configured to generate bi-phase modulation in accordance with an aspect of the present invention. The NTLTL modulator 50 can be employed as an Ultra Wide Band Impulse Radio and Radar modulator. The NLTL modulator 50 includes a divider 52 that receives a sinusoidal input signal that is divided into a first and a second carrier signal, which are provided to a DDN 54. The DDN 54 is formed of a first NLTL 56 comprised of a plurality of transmission sections periodically loaded by Schottky varactor diodes and a second NLTL 58 comprised of a plurality of transmission sections periodically loaded by Schottky varactor diodes. The first and second NLTLs 56 and 58 are configured as positive diode polarity NLTLs. The first NLTL 56 is bias modulated by a baseband input signal that contains the desired data to be modulated. The baseband signal is coupled to the first NLTL 56 through a choke inductor L1 that blocks AC voltages but passes DC voltages. The second NLTL 58 is biased by a fixed positive DC voltage at $V_{MID}$ through a choke inductor L2 that blocks AC voltages but passes DC voltages.

The baseband signal can have a first state that is below $V_{MID}$ and a second state that is above $V_{MID}$. The first and second states provide the desired bi-phase modulation. The fixed DC voltage $V_{MID}$ and the second NLTL 58 provide a reference delay path, while the first and second states of the baseband signal and the first NLTL 56 provide for a positive or negative delta delay path. As illustrated at the output of the first NLTL 56, if the baseband signal has a voltage in the first state below $V_{MID}$, the first NLTL will provide the first carrier signal that lags the second carrier signal (i.e., Reference signal) that is output from the second NLTL 58. If the baseband signal has a voltage in the second state above $V_{MID}$, the first NLTL 56 will provide the first carrier signal leads the second carrier signal that is output from the second NLTL 58. This is due to the fact that the less reverse bias on the Schottky varactor diodes increased the diode capacitance value causing a signal to be delayed more and the more reverse bias on the Schottky varactor diodes decreases the diode capacitance value causing a signal to be delayed less.

The first and second carrier signals are then provided to an IFN 60. The IFN 60 is formed of a third NLTL 62 configured in a positive diode polarity configuration and a second NLTL 64 configured in a negative diode polarity configuration. The IFN 60 is AC coupled to the DDN 54 via blocking capacitors C3 and C4, which block the DC biasing of the NLTLs of the IFN 60 and DC biasing of the NLTLs of the DDN 54 from each other. The third NTL 62 is biased by a fixed positive supply voltage $V_1$ through a choke inductor L3, and the fourth NLTL 64 is biased by a fixed negative supply voltage $-V_1$ through a choke inductor L4. The fixed positive supply voltage $V_1$ and fixed negative supply voltage $-V_1$ have substantially equal but opposite polarity. The third NLTL 62 sharpens the rising edge of the first carrier signal and the fourth NLTL inverts the second carrier signal and sharpens the falling edge of the inverted second carrier signal. The oppositely edge sharpened first and second carrier signals are delayed relative to one another based on the state of the baseband signal that biases the first NLTL 56.

The IFN 60 provides the oppositely edge sharpened first and second carrier signals to a power combiner 66 that converts the delta delay of the first and second carrier signals into modulated sharp impulses with encoded data based on a state of the baseband signal. If the baseband signal is in a first state below $V_{MID}$, then the first carrier lags the second carrier signal slightly and the combiner 66 outputs a modulated sharp impulse that is a positive pulse representing a logic "1". If the baseband signal is in the second state above $V_{MID}$, then the first carrier signal leads the second carrier signal slightly and the combiner 66 outputs a modulated sharp impulse that is a negative pulse representing a logic "0". It is to be appreciated that whether a pulse is positive or negative is based on the right amount of delay between compressed edges and not necessarily whether or not one carrier signal leads or lags another carrier signal.

Figure 9:
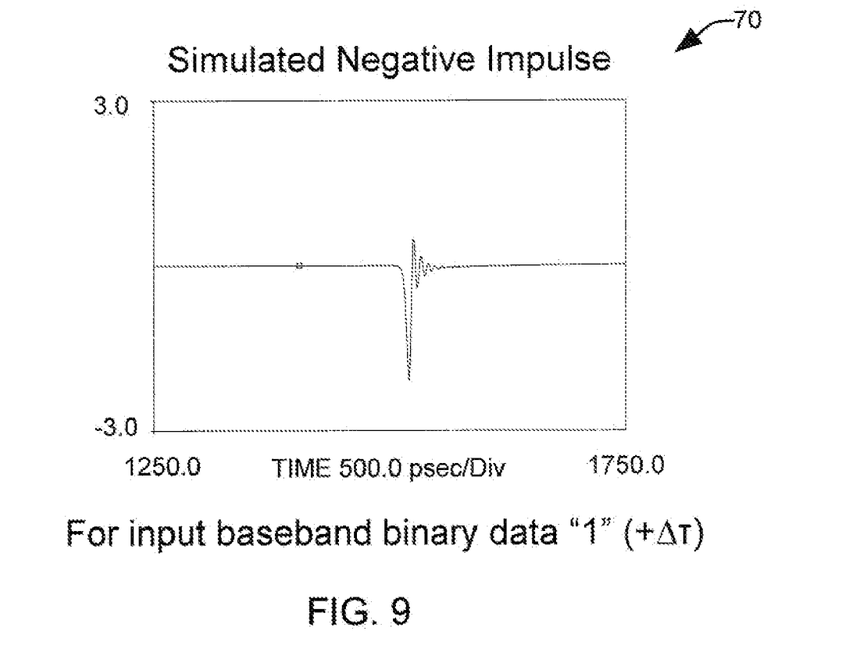
FIG. 9 illustrates a graph of amplitude versus time of a resultant negative impulse caused by the first carrier signal having a positive delay relative to the second carrier signal in accordance with an aspect of the present invention.
Figure 10:
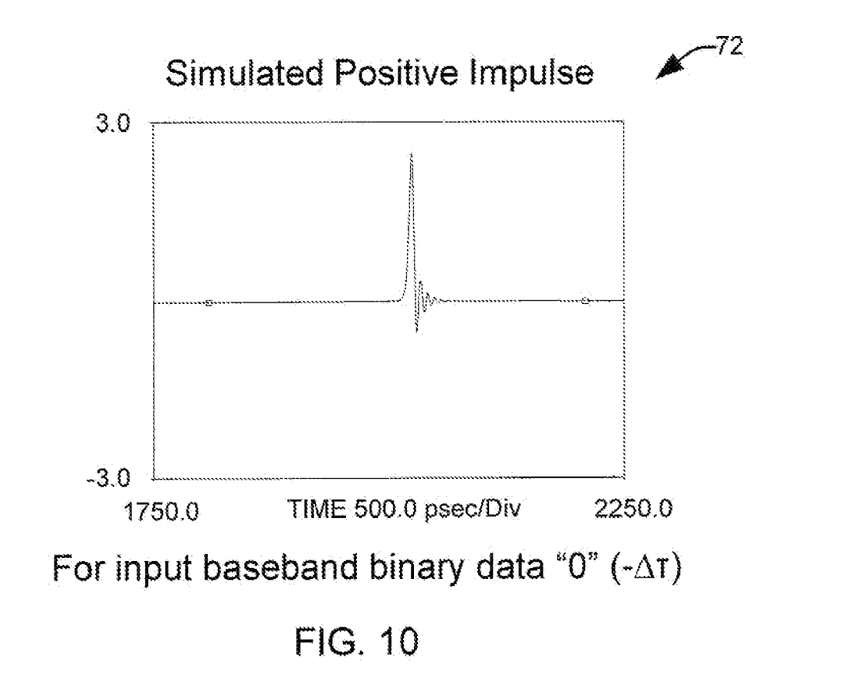
FIG. 10 illustrates a graph of amplitude versus time of a resultant positive impulse caused by the first carrier signal having a negative delay relative to the second carrier signal in accordance with an aspect of the present invention.

It is to be further appreciated that if the first and second NLTLs 56 and 58 were configured in negative diode polarity configurations then if the baseband signal is in the first state below $V_{MID}$, then the first carrier lead the second carrier signal and if the baseband signal is in the second state above $V_{MID}$, then the first carrier would lag the second carrier signal. Additionally, the third NLTL can be configured as a negative diode polarity configuration and the fourth NLTL can be configured as a positive diode polarity configuration as long as the third and fourth NLTLs having opposite diode polarity configurations. FIG. 9 illustrates a graph 70 of amplitude versus time of a resultant negative impulse caused by the first carrier signal having a positive delay relative to the second carrier signal. FIG. 10 illustrates a graph 72 of amplitude versus time of a resultant positive impulse caused by the first carrier signal having a negative delay relative to the second carrier signal.

Figure 11:
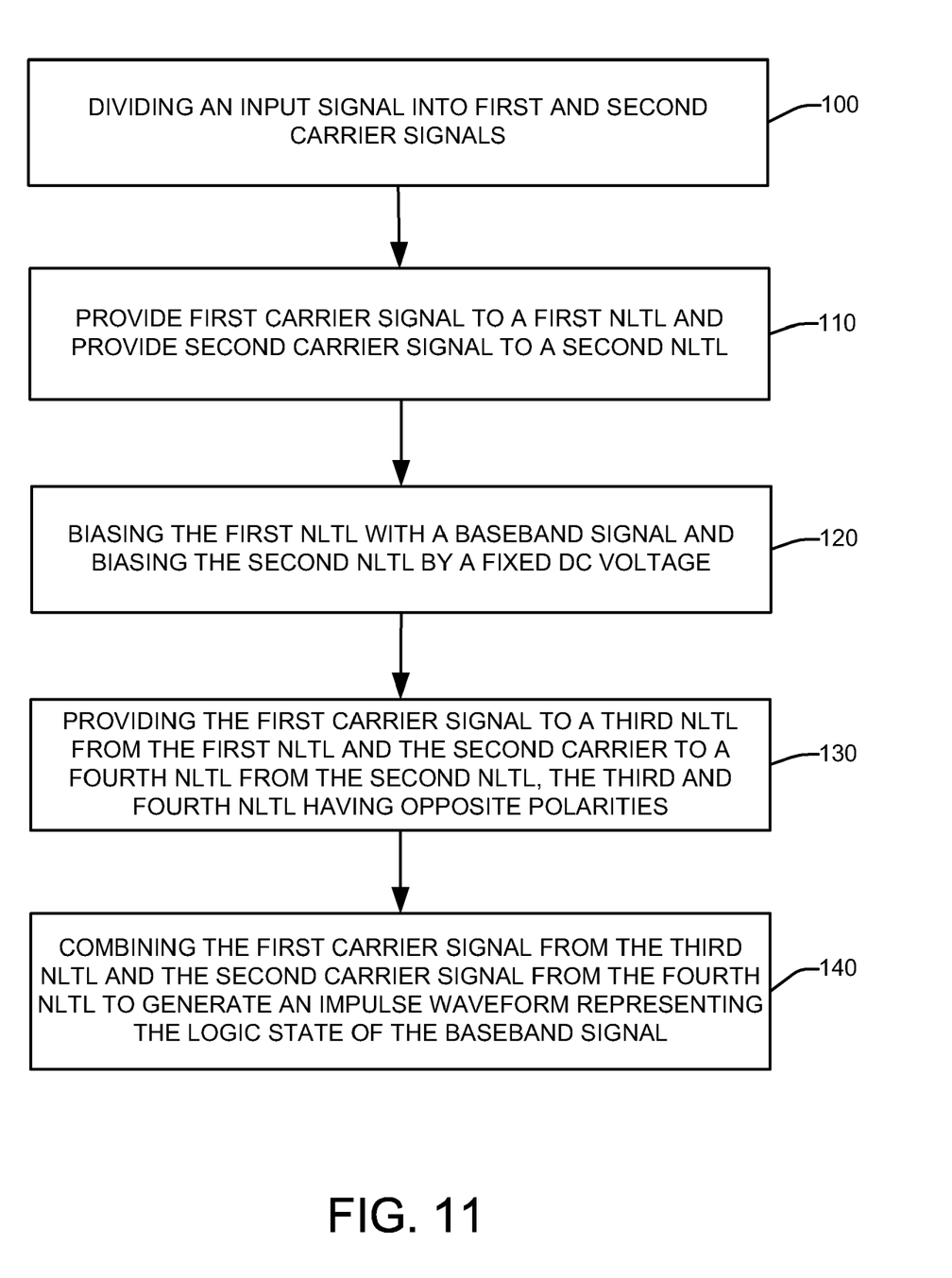
FIG. 11 illustrates a methodology for modulating a baseband signal into an impulse waveform in accordance with an aspect of the present invention.

FIG. 11 illustrates a methodology for modulating a baseband signal into an impulse waveform in accordance with an aspect of the present invention. At 100, a sinusoidal input signal is divided into a first carrier signal and a second carrier signal, such that the second carrier signal is a substantial duplicate of the first carrier signal. At 110, the first carrier signal is provided to a first NLTL and the second carrier signal is provided to a second NLTL. The first and second NLTL are in a same diode polarity configuration, which is either both having a positive diode polarity configuration with cathodes of Schottky varactor diodes coupled to a transmission lines and positive bias signals, or both having a negative diode polarity configuration with anodes of Schottky varactor diodes coupled to a transmission lines and negative bias signals. At 120, the first NLTL is biased with a baseband signal and the second NLTL is biased by a fixed DC voltage. The methodology then proceeds to 130.

At 130, the first carrier signal is provided to a third NLTL from the first NLTL and the second carrier signal is provided to a fourth NLTL from the second NLTL. The third and fourth NLTL are in opposite diode polarity configurations. For example, the third NLTL can be in a positive diode polarity configuration with cathodes of Schottky varactor diodes coupled to a transmission lines and a positive fixed DC bias signal, and the fourth NLTL can be in a negative polarity configuration with anodes of Schottky varactor diodes coupled to a transmission lines and a negative fixed DC bias signal. Alternatively, the fourth NLTL can be in a positive diode polarity configuration with cathodes of Schottky varactor diodes coupled to a transmission lines and a positive fixed DC bias signal, and the third NLTL can be in a negative diode polarity configuration with anodes of Schottky varactor diodes coupled to a transmission lines and a negative fixed DC bias signal. Furthermore, the magnitude of the positive fixed DC bias is substantially equal to the magnitude of the negative fixed DC bias signal. At 140, the first carrier signal from the third NLTL is combined with the second carrier signal of the fourth NLTL to generate an impulse waveform that represents the logic state of the baseband signal.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

What is claimed is:

1. A modulator comprising:
   a nonlinear transmission line (NLTL) that is bias modulated by a baseband signal, a given logic state of the baseband signal determines a delay amount of a first carrier signal through the NLTL;
   an impulse forming network (IFN) that includes a first NLTL that receives the first carrier signal delayed by the determined delay amount and a second NLTL that receives a second carrier signal having a fixed delay amount, the first NLTL and second NLTL having opposite diode polarity configurations; and
   a power combiner that converts a delta delay of the first carrier signal relative to the second carrier signal to a sharp impulse that represents the given logic state of the baseband signal.

2. The modulator of claim 1, further comprising a NLTL that is biased by a fixed DC point to provide a fixed delay amount to the second carrier signal.

3. The modulator of claim 2, further comprising a divider that receives a sinusoidal input signal and provides the first carrier signal and the second carrier signal, such that the second carrier signal is a substantial duplicate of the first carrier signal.

4. The modulator of claim 2, wherein the NLTL that is bias modulated by the baseband signal is a same diode polarity configuration as the NLTL that is biased by a fixed DC point.

5. The modulator of claim 1, wherein the delta delay of the first carrier signal relative to the second carrier signal is positive to represent a first logic state of the baseband signal and the delta delay of the first carrier signal relative to the second carrier signal is negative to represent a second logic state of the baseband signal.

6. The modulator of claim 1, wherein the combiner provides a negative impulse to represent a first logic state of the baseband signal and a positive impulse to represent a second logic state of the baseband signal.

7. The modulator of claim 1, wherein the sharp impulse can have a plurality of different pulse widths that represent different logic states of the baseband signal.

8. The modulator of claim 1, further comprising a choke inductor that couples the baseband signal to the NLTL that is bias modulated by the baseband signal.

9. The modulator of claim 1, wherein the NLTL that is bias modulated by a baseband signal is coupled to the IFN by at least one DC blocking capacitor.

10. The modulator of claim 1, wherein the positive polarity diode configuration of the first NLTL and second NLTL is biased by a positive fixed DC bias and the negative polarity diode configuration of the first NLTL and the second NLTL is biased by a negative fixed DC bias, the positive fixed DC bias and the negative fixed DC bias having substantially equal magnitudes.

11. A modulator comprising:
    a first nonlinear transmission line (NLTL) that provides a delta delay path for a first carrier signal, the first NLTL being bias modulated by a baseband signal;
    a second NLTL that provides a reference delay path and is biased by a fixed DC point to provide a fixed delay amount to a second carrier signal, wherein a given logic state of the baseband signal determines a relative delay offset of first carrier signal with respect to the second carrier signal, wherein the first NLTL and the second NLTL have the same diode and bias polarity configuration;
    a third NLTL that receives the first carrier signal from the first NLTL;
    a fourth NLTL that receives the second carrier signal from the second NLTL, wherein the third NLTL and fourth NLTL having opposite diode and bias polarity configurations; and
    a power combiner that combines the first carrier signal and the second carrier signal and converts the relative delay offset to a sharp impulse that represents the given logic state of the baseband signal.

12. The modulator of claim 11, being an Ultra Wide Band Impulse Radio and Radar modulator.

13. The modulator of claim 11, further comprising a divider that receives a sinusoidal input signal and provides the first carrier signal and the second carrier signal, such that the second carrier signal is a substantial duplicate of the first carrier signal.

14. The modulator of claim 11, wherein the combiner provides a negative impulse to represent a first logic state of the baseband signal and a positive impulse to represent a second logic state of the baseband signal.

15. The modulator of claim 11, wherein the sharp impulse can have a plurality of different pulse widths that represent different logic states of the baseband signal.

16. A method of modulating a baseband signal into an impulse waveform, the method comprising:
    providing a first carrier signal to a first nonlinear transmission line (NLTL);
    providing a second carrier signal to a second NLTL;
    biasing the second NLTL with a fixed DC voltage;
    biasing the first NLTL with a baseband signal, wherein a given logic state of the baseband signal determines a relative delay offset of first carrier signal with respect to the second carrier signal;
    providing the first carrier signal to a third NLTL from the first NLTL;
    providing the second carrier signal to a fourth NLTL from the second NLTL, the third and fourth NLTLs having opposite diode polarity configurations; and combining the first carrier signal from the third NLTL and the second carrier signal from the fourth NLTL to generate and impulse waveform representing the given logic state of the baseband signal.

17. The method of claim 16, wherein the impulse waveform is an Ultra Wide Band Impulse Radio and Radar modulated signal.

18. The method of claim 16, further comprising dividing a sinusoidal input signal into the first carrier signal and the second carrier signal, such that the second carrier signal is a substantial duplicate of the first carrier signal.

19. The method of claim 16, wherein the combining the first carrier signal and the second carrier signal generates an impulse waveform that provide a negative impulse to represent a first logic state of the baseband signal and a positive impulse to represent a second logic state of the baseband signal.

20. The method of claim 16, wherein the impulse waveform can have sharp impulses with a plurality of different pulse widths that represent different logic states of the baseband signal.

* * * * *